(12) United States Patent
Gupta et al.

(10) Patent No.: US 10,365,780 B2
(45) Date of Patent: Jul. 30, 2019

(54) CROWDSOURCING FOR DOCUMENTS AND FORMS

(71) Applicant: Adobe Inc., San Jose, CA (US)

(72) Inventors: Yash Kumar Gupta, Agra-Uttar Pradesh (IN); Lalit Vohra, New Delhi (IN); Abhishek Modi, Rajasthan (IN); Aditya Kumar Pandey, New Delhi (IN); Ankit Pangasa, Delhi (IN); Frederic Thevenet, San Francisco, CA (US); Kirk B. Gould, Cupertino, CA (US); Mohit Bansal, Bareilly-Uttar Pradesh (IN); Nishant Kaushik, Bahadurgarh (IN); David Sherry, San Jose, CA (US); Steve Dakin, San Jose, CA (US); Vishal K. Gupta, Delhi (IN)

(73) Assignee: Adobe Inc., San Jose, CA (US)

( * ) Notice: Subject to any disclaimer, the term of this patent is extended or adjusted under 35 U.S.C. 154(b) by 895 days.

(21) Appl. No.: 14/269,589

(22) Filed: May 5, 2014

(65) Prior Publication Data

US 2015/0319198 A1    Nov. 5, 2015

(51) Int. Cl.
*G06F 3/048* (2013.01)
*G06F 3/0481* (2013.01)
(Continued)

(52) U.S. Cl.
CPC ............ *G06F 3/0481* (2013.01); *G06F 16/93* (2019.01); *H04L 65/403* (2013.01); *H04L 67/10* (2013.01); *H04L 67/42* (2013.01)

(58) Field of Classification Search
None
See application file for complete search history.

(56) References Cited

U.S. PATENT DOCUMENTS 8,346,391 B1 * 1/2013 Anhalt ............... B25J 9/163
700/248
9,305,099 B1 * 4/2016 Dean ............... G06F 17/2235
(Continued)

OTHER PUBLICATIONS

Crowdsourcing, http://en.wikipedia.org/w/index.php?title=Crowdsourcing&printable=yes, printed from the internet on May 2, 2014, 9 pages.
(Continued)

*Primary Examiner* — Hua Lu
(74) *Attorney, Agent, or Firm* — Finch & Maloney PLLC

(57) ABSTRACT

Techniques are disclosed for making an electronic document easier to use based on prior interactions with the same or a similar document by other users. An electronic document is presented to one or more users in an interactive environment. Interactions between the users and the document can be recorded as usage data. The usage data may represent one or more operations performed on the electronic document by the users. Based on the usage data, an enhanced user interaction feature associated with the document is configured. The electronic document and the enhanced user interaction feature are then presented to another user in another interactive environment. The enhanced user interaction feature makes using the document easier than it would be if the feature was not present, particularly for users who are unfamiliar with the document.

20 Claims, 12 Drawing Sheets

(51) Int. Cl.
*H04L 29/06* (2006.01)
*H04L 29/08* (2006.01)
*G06F 16/93* (2019.01)

(56) References Cited

U.S. PATENT DOCUMENTS

| | | | |
|---|---|---|---|
| 2007/0220428 A1* | 9/2007 | Kureshy | G06F 3/04895 715/708 |
| 2009/0100351 A1* | 4/2009 | Bromenshenkel | G06F 3/01 715/757 |
| 2009/0248615 A1* | 10/2009 | Drory | G06F 16/16 |
| 2011/0087658 A1* | 4/2011 | Lunt | G06Q 30/0275 707/727 |
| 2011/0125678 A1* | 5/2011 | Partridge | G06Q 30/02 706/12 |
| 2011/0126154 A1* | 5/2011 | Boehler | G06F 9/453 715/811 |
| 2011/0231409 A1* | 9/2011 | Dhara | H04L 12/1818 707/748 |
| 2011/0289161 A1* | 11/2011 | Rankin, Jr. | G06Q 10/107 709/206 |
| 2011/0289409 A1* | 11/2011 | Batey | G06F 9/453 715/705 |
| 2011/0320957 A1* | 12/2011 | Tiddens | G06F 3/04817 715/747 |
| 2012/0137367 A1* | 5/2012 | Dupont | G06F 21/00 726/25 |
| 2012/0174205 A1* | 7/2012 | Edmeades | G06F 21/316 726/7 |
| 2013/0055109 A1* | 2/2013 | Takamura | H04N 21/41415 715/753 |
| 2013/0173568 A1* | 7/2013 | Josifovski | G06F 16/951 707/706 |
| 2014/0143012 A1* | 5/2014 | Alon | G06Q 30/0202 705/7.29 |
| 2014/0181709 A1* | 6/2014 | Rainisto | G06F 3/0481 715/765 |
| 2014/0245141 A1* | 8/2014 | Yeh | G06F 9/453 715/708 |
| 2014/0282178 A1* | 9/2014 | Borzello | G06F 9/453 715/771 |
| 2014/0379729 A1* | 12/2014 | Savage | H04L 65/403 707/748 |

OTHER PUBLICATIONS

Wisdom of the crowd, http://en.wikipedia.org/w/index.php?title=Wisdom_of_the_crowd&printable=yes, printed from the internet on May 2, 2014, 5 pages.

* cited by examiner

CROWDSOURCING FOR DOCUMENTS AND FORMS

FIELD OF THE DISCLOSURE

This disclosure relates to the field of data processing, and more particularly, to techniques for providing an electronic document and an enhanced user interaction feature to one or more users.

BACKGROUND

Electronic documents and forms, such as PDF, ePub and HTML, can contain text, graphics, links, form fields, attachments, interactive elements, and other kinds of content. Users may interact with such documents and forms in a variety of ways, such as by reading or skimming them, clicking on various elements to follow links or open hidden content, filling in form fields, attaching additional information, marking documents with annotations, and so on. In many cases, documents can contain large amounts of information, and document interfaces can provide many functions. As such, a given user of a document may have numerous available choices and options when viewing and interacting with that document.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
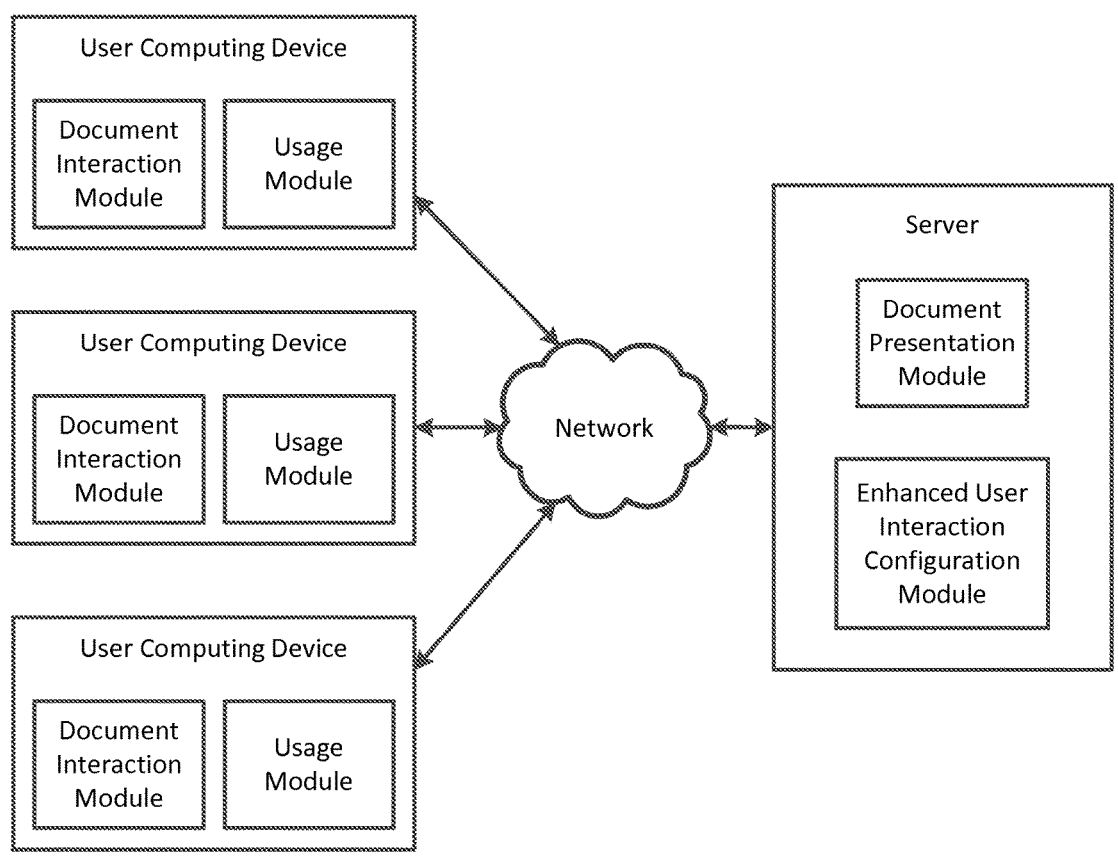
FIG. 1 illustrates an example client-server system for providing an electronic document and an enhanced user interaction feature to one or more users, in accordance with an embodiment of the present invention.

As previously indicated, a user of a given electronic document may have numerous available choices and options when viewing and interacting with that document. Unfortunately, not all of the information or functions may be of immediate interest or concern to the user, and their presence can make interaction with the document more complex and difficult or otherwise diminish the user's experience with that document. Further, it is not always apparent to the user how to interact with complex documents and forms. As a result, the user may expend a substantial amount of additional time searching for the information of interest and learning how to interact with the document or form. To this end, there are many challenges for users who read and interact with electronic documents and forms. For example, one document may contain hyperlinks to several other documents. When a user initially sees a document with many links, it can be difficult for the user to decide which of the links should be followed, and in what order, to get a better grasp of the subject being studied. As a result, the user may spend a lot of time and effort wading through many different documents. This, in turn, can lead to other problems, such as information overload (e.g., where comprehension is impeded by the presence of too much information) and cognitive dissonance (e.g., where comprehension is impeded by the presence of conflicting information, either actual or perceived). In another example, forms may be used to collect information from a user. Some forms are designed to accept attachments of files or specific kinds of information. However, it may not necessarily be apparent to the user which files or kinds of information should be attached or entered when filling out the form. Many other situations exist where users spend a lot of time interacting with unfamiliar documents and forms. These interactions may, for example, include scrolling or rapid paging through the document or otherwise skipping to the most relevant parts of a document, magnifying the view of a document, dwelling on a particular section of the document that is of particular interest, and performing other operations on the document. As will be appreciated in view of the present disclosure, prior interactions with an electronic document by several users can be representative of how other future users may interact with the same or a similar document. In this sense, a new user who is unfamiliar with a document can benefit from these past user interactions.

To this end, and in accordance with an embodiment of the present invention, techniques are disclosed for making an electronic document easier to use for a user who is unfamiliar with the document based on prior interactions with the same or a similar document by other users. In one specific example embodiment, an electronic document is presented to one or more users in an interactive environment. The interactive environment can include any computer-based application or user interface that enables the user to perform various operations on the document. Examples of such operations include navigating through the document, modifying the document, marking-up the document, altering the way the document is displayed, sharing the document with other users, attaching files or other data to the document, and configuring aspects of the user interface, such as the location of input controls (e.g., navigating nested menus and relatively hidden features), the behavior of outputs, default feature settings, and other functions. As will be appreciated in light of this disclosure, all such interactions between the users and the document can be recorded as usage data. The usage data may, for example, represent one or more operations performed on the electronic document by the users, the time or duration of such operations, the sequence in which the operations are performed, the navigation path through the document, the navigation path through the user interface associated with the document, or any combination of metrics suitable for describing how the users interact with the document. In some cases, where the usage data reflects the interactions of multiple users with the same document or similar documents, the data may be obtained through the use of so-called crowdsourcing or other information gathering techniques. Based on the usage data, an enhanced user interaction feature associated with the document can be configured. The enhanced user interaction feature may include, for example, code that is executed in conjunction with the document to provide a subsequent user of that document with additional information about the document (e.g., suggestions, instructions, or annotations) or to automatically perform certain operations on the document that would ordinarily have to be carried out by the user (e.g., jumping to, or zooming in on, a certain portion of the document, entering data on a form, etc.). The electronic document and the enhanced user interaction feature can then be presented to another user. The enhanced user interaction feature makes using the document easier than it would be if the feature was not present, particularly for users who are unfamiliar with the document.

In some example cases, the enhanced user interaction feature can be embedded within the document and travel with that document. In other cases, the enhanced user interaction feature can exist independently of the document but still be associated with the document. In any such cases, the enhanced user interaction feature can be configured to execute when the document is opened or while the user is using or interacting with the document in any other way. For instance, Adobe Reader may be configured to execute the enhanced user interaction feature of PDF documents. Likewise, Microsoft Word and Excel may be configured to execute the enhanced user interaction feature of Word (.doc) and Excel (.xls) documents. As will be further appreciated in light of this disclosure, note that the usage data upon which the enhanced user interaction feature is based may also include user interface guidance, such as menu navigation sequences or usage instructions. For instance, if other users of a given document consistently modify the document to include a text box in one particular section of that document, then the enhanced user interaction feature may automatically execute to create the text box for the user when the document is opened. Alternatively, the enhanced user interaction feature may provide the user a screen tip or other instructional guidance on how to create the text box when that section of the document is displayed. Numerous other configurations and variations will be apparent in light of this disclosure.

The term "document," as used herein, generally refers to electronic documents, electronic forms, and any other type of information that a user can interact with electronically by operation of a computing system or device. Examples of such documents include plain text, email, word processing documents and forms, electronic books, Portable Document Format (PDF) documents and forms, and Hypertext Markup Language (HTML) documents and forms. In some instances, a document can include read-only (e.g., unmodifiable) content. In some other instances, a document can include fields into which a user may input data, or which otherwise allows the user to modify the content of the document (e.g., by adding, changing or deleting content). In some other instances, a document may include or be associated with executable code that, when invoked, causes certain operations to be performed on the document (e.g., print, mail, translate language, format, automatic form fill, etc.). In some cases, a document includes code for generating a user interface, such as an Extensible Markup Language (XML) menu resource file. Other examples will be apparent in light of the present disclosure.

The term "crowdsourcing" generally refers to the practice of obtaining and utilizing information or services from a large group of people. Often, but not necessarily, the people engaged in a crowdsourcing activity are members of the general public, people who are not working collaboratively, or people who otherwise have no obligations with respect to others involved in the crowdsourcing activity. Such groups of people can provide results that are beneficial in a number of ways. For example, when the participants of a crowdsourcing activity perform a task independently of one another, it is more likely that the results will reflect the natural behaviors of the participants because each participant has little or no influence over the behavior of other participants. This can provide information that is useful for predicting how people may, for example, interact with an electronic document in the future. Such information can be used to influence user behavior, to automate certain tasks, or otherwise enhance the experience of performing similar tasks (e.g., interactions with a document) based on the information obtained from the crowdsourcing activity.

Example System

FIG. 1 illustrates an example client-server system for providing an electronic document and an enhanced user interaction feature to one or more users, in accordance with an embodiment. The system includes one or more user computing devices and a server, each electronically interconnected via a network (e.g., a wide area network, such as the Internet, or a local area network). Generally, the computing devices can be any type of device, such as a PC, tablet, or smart phone, configured to access and provide documents (e.g., a web page, a word processing document, a fixed layout document, etc.) provisioned by a server. It will be understood that the functions of the computing devices variously described in this disclosure can be performed on and by any number of computing devices, depending on the particular application of the system. For instance, one or more of the computing devices can include a document interaction module, such as a browser or other application suitable for retrieving, processing, displaying and interacting with the document. The computing devices, the server, or any combination of these can further include a usage module, which may, for example, be configured to monitor and record usage data representing operations performed on the document by a user, or other types of interactions with the document. Such interactions may include viewing, modifying, or marking-up the document, or interacting with objects in the document that are responsive to a user input (e.g., a hyperlink, zoom control, formatting control, editing control, etc.). Further, the server can include a document presentation module and an enhanced user interaction module. The document presentation module may, for example, be configured to present a document to a user via one or more of the user computing devices. The enhanced user interaction configuration module may, for example, be configured to configure an enhanced user interaction feature associated with the document based at least in part on usage data recorded by the usage module(s). The enhanced user interaction feature may include, for instance, a set of instructions that, when executed by the document interaction module, provide additional or supplemental functionality that is not otherwise provided by, with, or in the document.

Example Methodologies

Figure 2:
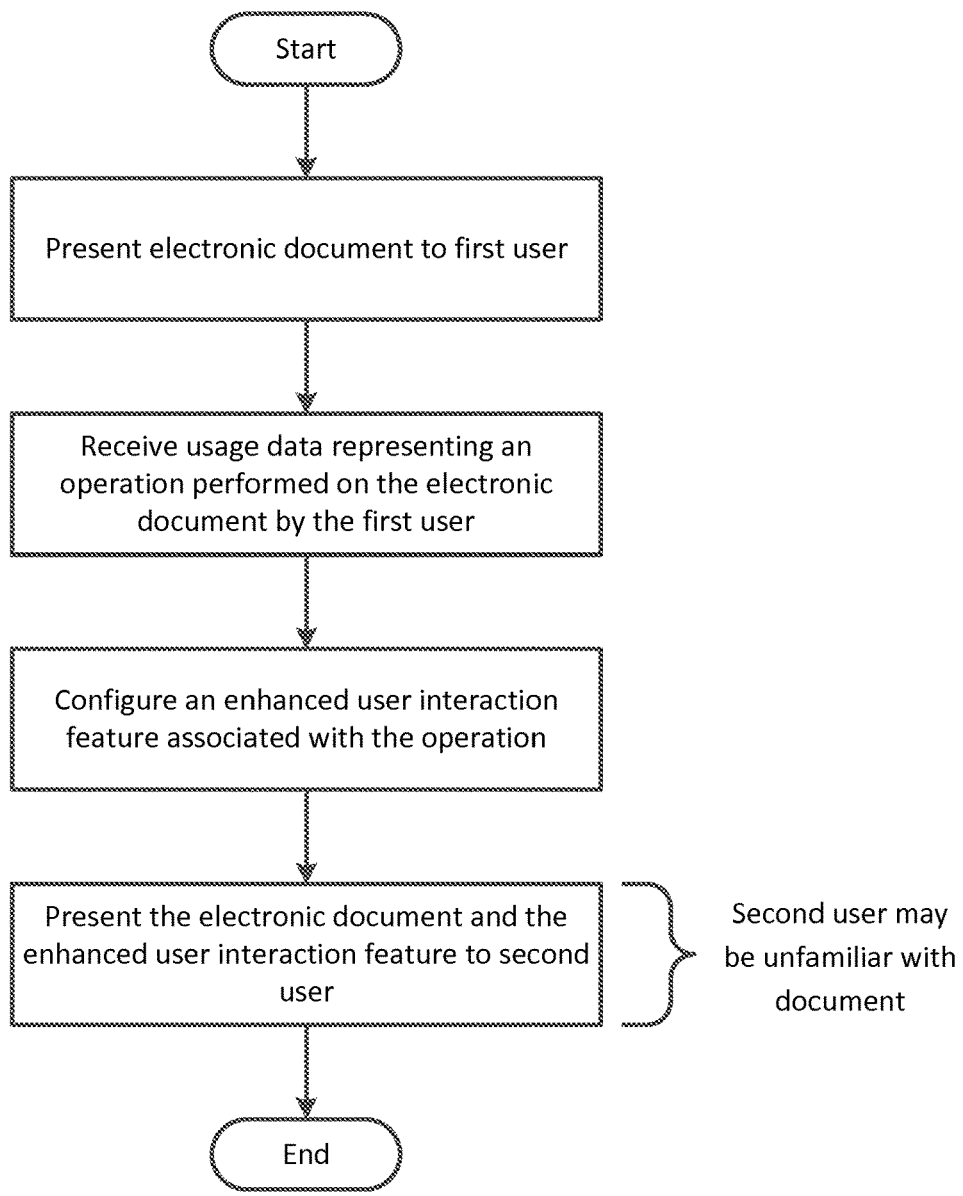
FIGS. 2, 3A, 4A, 5A and 6A show several example methodologies for providing an electronic document and an enhanced user interaction feature to one or more users, in accordance with various embodiments of the present invention.

FIG. 2 is a flow diagram of an example methodology for providing an electronic document and an enhanced user interaction feature to one or more users, in accordance with an embodiment. The example methodology may, for example, be implemented by the server of FIG. 1. The method begins by presenting an electronic document to a first user or group of users. Presentation of the document can include sending data representing the content of the document to a suitable application or service (e.g., the document interaction module of FIG. 1) executing on a user-accessible computing device. The data may be sent from the server to the user computing device(s) via a communications channel (e.g., the network of FIG. 1). The first user(s) may interact with the document in any suitable manner. For example, the first user(s) may read, modify, annotate, or perform other operations that are supported by the document and the document interaction module. One or more operations performed on the document by the first user(s) can be observed and recorded (e.g., by the usage module(s) of FIG. 1) to produce usage data. The method continues by receiving the usage data, and configuring an enhanced user interaction feature associated with the operation(s) performed by the first user(s) based on the usage data. The configuration of the enhanced user interaction feature may, for example, be performed by the enhanced user interaction configuration module of FIG. 1. The electronic document and the enhanced user interaction feature can then be presented by the server to a second user or group of users. In some cases, the second user(s) may be unfamiliar with the document or use of the document. The second user(s) may interact with the document in any suitable manner. Further, the enhanced user interaction feature can provide, to the second user(s), functionality for interacting with the document that is not included in the document alone. For example, the enhanced user interaction feature may provide functionality that improves the interaction between the second user and the document by automatically performing one or more of the same or similar operations performed by the first user(s), assisting the second user(s) with performance of the operation(s) (e.g., displaying suggestions, tips, instructions, or controls), or any combination of these aspects.

Several examples of implementations of the enhanced user interaction feature are described below. In general, the enhanced user interaction feature can include data or executable instructions that, when presented to and processed by a suitable computing device, provide functionality for interacting with an electronic document that is not otherwise present or accessible by the second user(s). Further, in some cases, the enhanced user interaction feature can include any extension, alteration, or supplement to the functionality of a document, or the functionality of an application or service used by the second user(s) for interacting with the document.

Figure 3A:
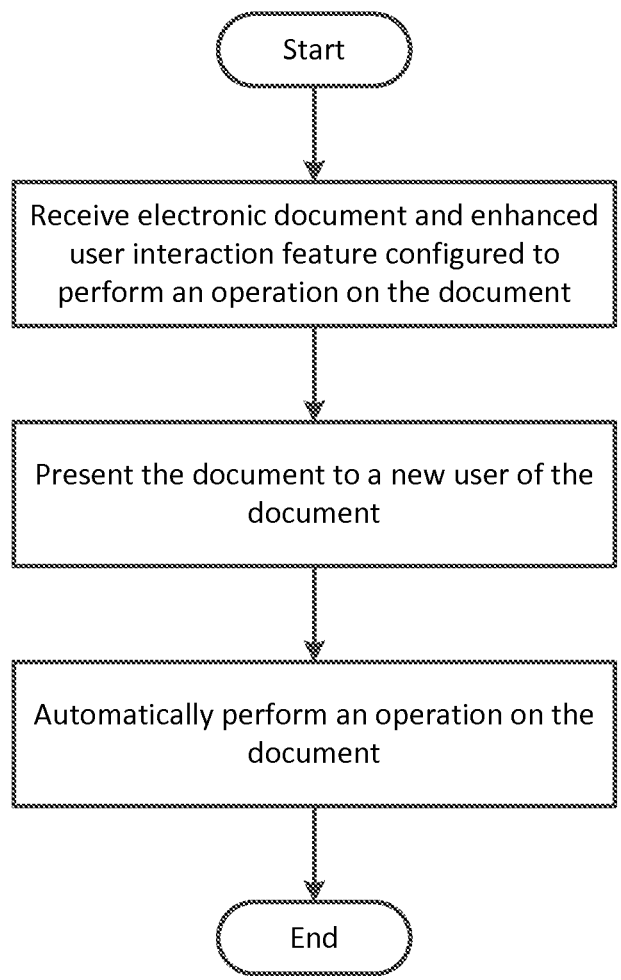

FIG. 3A is a flow diagram of an example methodology for providing an electronic document and an enhanced user interaction feature to one or more users, in accordance with an embodiment. An electronic document is received along with an enhanced user interaction feature configured to automatically perform an operation on the document. The operation may, for example, be an operation that was previously performed on the document by a prior user of the document. The document is then presented to a new user of the document (e.g., a user who is unfamiliar with the document or who has not previously interacted with the document). Subsequently, the operation is automatically performed on the document while, for example, the new user is interacting with the document (e.g., when the user opens or reads the document) or at an otherwise suitable time. As noted above, examples of such operations include navigating through the document (e.g., viewing specific portions of the document in a particular sequence), modifying the document, marking-up the document, altering the way the document is displayed, sharing the document with other users, attaching files or other data to the document, and configuring aspects of the user interface, such as the location of input controls, the behavior of outputs, default feature settings, and other functions.

In a specific embodiment, the operation performed by the enhanced user interaction feature can include automatically supplying default views of the document based on the type of document, the type of device being used to view the document, and how other users have interacted with the document in the past. Initially, an electronic document is presented to a user in an interactive environment. The interactive environment can include any application or user interface executing on a computing device that enables the user to interact with the document by performing various operations. There are, for instance, many documents which can be viewed online or using a viewing application (e.g., Adobe Reader) on devices having various form factors and display sizes. Different documents can be viewed using different layouts, levels of magnification, and other viewing parameters. For example, viewing parameters set by a user can be recorded for similar document types for one user or a group of users, and made available for subsequent viewing sessions. Operations performed on the document by multiple users may reflect how users in general interact with the document. Examples of such operations include jumping to a certain page or section of the document, zooming in on a portion of the document, translating the document into a different language, and other functions. The operations performed on the document by the user can be recorded as usage data, which represent the type of operations performed on the document by the user (or by multiple users) the time or duration of the operations, the sequence in which the operations are performed, or any combination of metrics suitable for describing how the user interacts with the document. This usage data can be stored on a server along with the device form factor and device analytics.

The usage data can be analyzed to determine one or more default views of the document on the basis of which operations were performed by previous users of the document. Based on the usage data, an enhanced user interaction feature associated with the operation(s) can be configured. The enhanced user interaction feature may include, for example, code that is executed in conjunction with the document to automatically perform operations associated with displaying default views of the document. Thus, while another user is viewing the same document, one or more of the operations performed by the previous user(s) (e.g., scaling, zooming, moving, rotating, jumping to a page, translating, etc.) can be automatically performed so as to replicate the default view of the document without additional user input. Alternatively, interactive elements (e.g., touch points on the display) can be added to the user interface, which allow the user to automatically change the view to the default setting. In some cases, the server can rank such operations for a given document (e.g., based on frequency, recentness, number of distinct users performing the operations, or any combination of these) and perform or suggest performance of these operations in rank order as part of the enhanced user interactive feature.

Figure 3B:
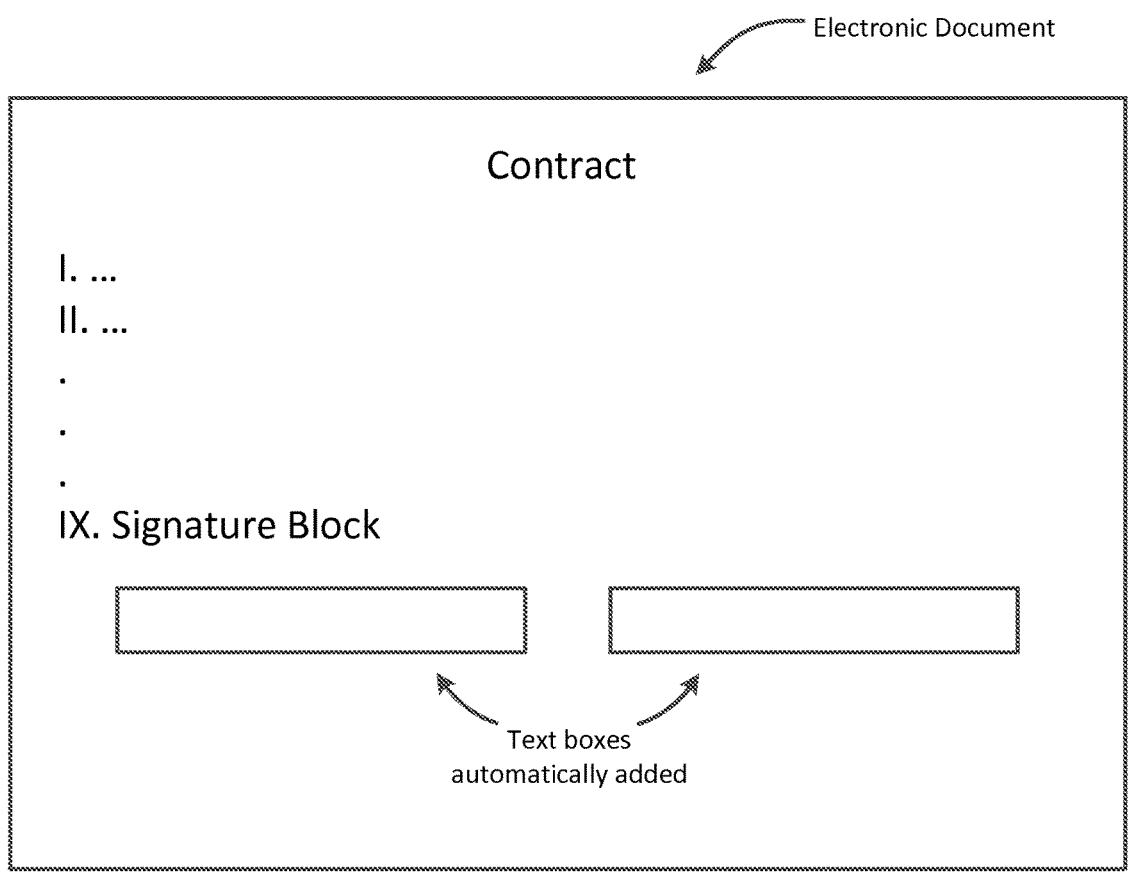
FIGS. 3B, 4B, 5B, 6B and 7 show several example user interfaces for providing an electronic document and an enhanced user interaction feature to one or more users, in accordance with various embodiments of the present invention.

FIG. 3B is an example user interface for providing an electronic document and an enhanced user interaction feature to one or more users, in accordance with an embodiment. As discussed with respect to FIG. 3A, an enhanced user interaction feature can be provided with an electronic document to a new user of the document. The enhanced user interaction feature can be associated with one or more operations performed by a prior user. For example, as shown in FIG. 3B, a contract may include a section for a signature, but the document may not necessarily include a text box for indicating where the signature should be placed. Thus, a prior user may have performed an operation to add one or more text boxes to the signature section of the document. Such an operation can be recorded as a usage of the document, which in turn can form the basis of the enhanced user interaction feature. In this example, the enhanced user interaction feature may be configured to automatically create the text box(es) for any viewer when the new user opens the document, or at some other time, such as while the user hovers a mouse pointer over the signature section of the document for some period of time (e.g., five seconds). In some example embodiments, the text box(es) can be added when the role of the user is one that has signing authority or when the viewer is the person who must sign the document.

Figure 4A:
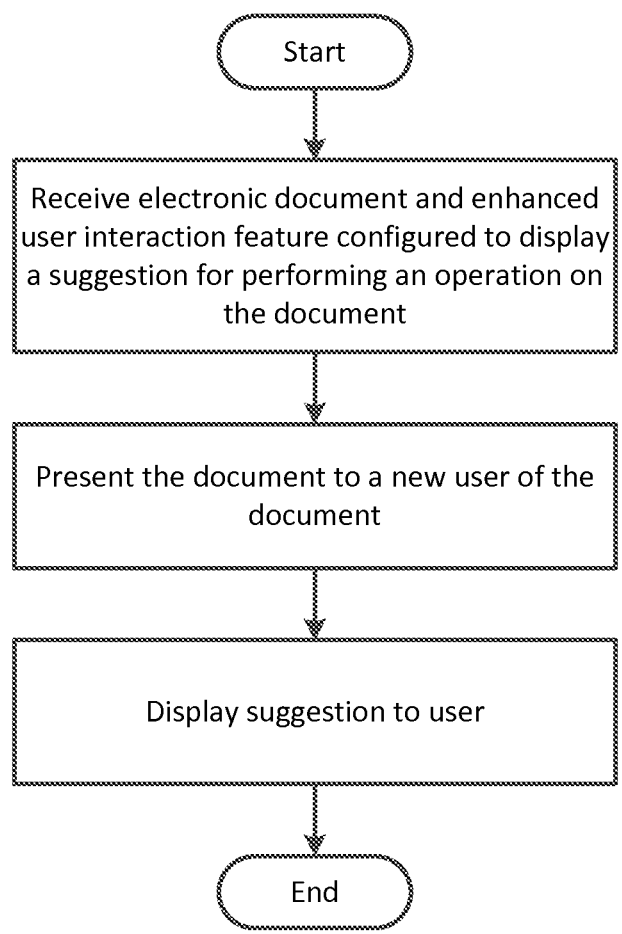

FIG. 4A is a flow diagram of another example methodology for providing an electronic document and an enhanced user interaction feature to one or more users, in accordance with an embodiment. An electronic document is received along with an enhanced user interaction feature configured to display a suggestion for performing an operation on the document. The document is then presented to a new user of the document (e.g., a user who is unfamiliar with the document or who has not previously interacted with the document). Subsequently, the suggestion is displayed to the user. The suggestion may, for example, take the form of text or graphics that supplement or annotate the content of the document or the user interface. In another example, the suggestion may take the form of an interactive element (e.g., an on-screen control that is responsive to a user input) that enables the user to easily perform a particular operation on the document.

In a specific embodiment, an interactive element can be configured to suggest important or often used links in a document based on prior usage of the links by other users. As noted above, electronic documents can contain interactive elements, such as hyperlinks, which are references to other documents, electronic resources (e.g., Web pages, document repositories, etc.), or various kinds of information. These interactive elements can be configured to perform various operations, such as redirecting the user to the referenced document for viewing. The links may reference many different documents or documents containing large amounts of information. As a result, a user who is unfamiliar with the document can save time by following the suggested links to more quickly obtain an understanding of the subject or topic of the document.

Initially, an electronic document is presented to a user in an interactive environment. The interactive environment can include any application or user interface executing on a computing device that enables the user to interact with the document by performing various operations. Examples of such operations include clicking on the interactive elements to follow links or open hidden content, and other functions. The operations performed on the document by the user can be recorded as usage data, which represent the type of operations performed on the document by the user (or by multiple users) the time or duration of the operations, the sequence in which the operations are performed, or any combination of metrics suitable for describing how the user interacts with the document. Based on the usage data, an enhanced user interaction feature associated with the operation(s) can be configured. The enhanced user interaction feature may include, for example, code that is executed in conjunction with the document to provide the user with additional information about the document (e.g., suggestions or annotations) or to automatically perform certain operations on the document that would ordinarily be carried out by the user (e.g., jumping to or zooming in on a certain portion of the document). For instance, the enhanced user interaction feature may be configured to display prominent visual indications to the user identifying which links were used by a prior user or users, such as by highlighting the links, changing the font size, boldness or color of the links, or displaying a separate section in the interactive environment (e.g., user interface, browser, etc.) in which the link or links are listed. In some cases, the enhanced user interaction feature may be configured to display the most frequently used links (e.g., five, ten, etc.) or display the links in the same sequence used by the prior user(s), or the most often used sequence by prior users. The electronic document and the enhanced user interaction feature can then be presented to the same or another user in another interactive environment. In this manner, the subsequent user can benefit from use of the enhanced user interaction feature while interacting with the document.

In a specific example, when a user 'A' clicks on a link 'a1' in a specific document 'D', a record of the link 'a1' being clicked is recorded. A rank can be assigned to link 'a1' based on one or more factors, such as the frequency of clicks on the link, the recentness of clicks on the link, the number of distinct users clicking on the link, or any combination of these. Other examples for ranking the link will be apparent in light of this disclosure. Note that the rank of the given link may be contextual (e.g., it pertains to the specific document as opposed to a different document). The same link can be ranked higher or lower when present inside a different document having similar subject matter. Based on the combined ranks of visits to all links in a specific document 'D' by all of the users, it is possible to find which links a new user 'B' would likely be interested in. These links can be displayed as suggestions to another user, for example, by highlighting the links, changing the color of the links, or listing the links in a separate portion of the user interface. This technique may be enhanced, for example, by adding to the ranking scores of each link in the specific document the ranking information of the user's friends or peers in a social network. This technique may be further enhanced, for example, by adding to the ranking scores of each outgoing link in a specific document a third-party search engine rank. A search engine rank can be used to break a tie when two links produce the same local rank. By configuring the enhanced user interaction feature to highlight or list certain links in a document, there is less information overload for new users that are studying a book or topic for the first time, and less cognitive dissonance for the users since it is not necessary to decide which links or references the user should look at next. This technique may also save time for the users as the documents are consumed.

In another specific embodiment, the enhanced user interaction feature can be configured to help a user interact with a document by reorganizing or otherwise modifying at least a portion a user interface based on previous operations performed by the user or other users on the document. In this manner, certain menu items can be suggested to the user based on interactions with the document by previous users, and other menu items can be hidden or demoted. For instance, menus within the user interface can be dynamically loaded from an XML menu resource file. The XML menu resource file can be modified by the enhanced user interaction feature on the basis of previous operations performed by other users (e.g., selection of certain menu items). The menu items and corresponding functions that are used more often by the user can be moved or promoted up to a location within the menu where they are more visible and accessible, while the menu items that are not used frequently can be given an inferiorly exposed location within the menu.

Figure 4B:
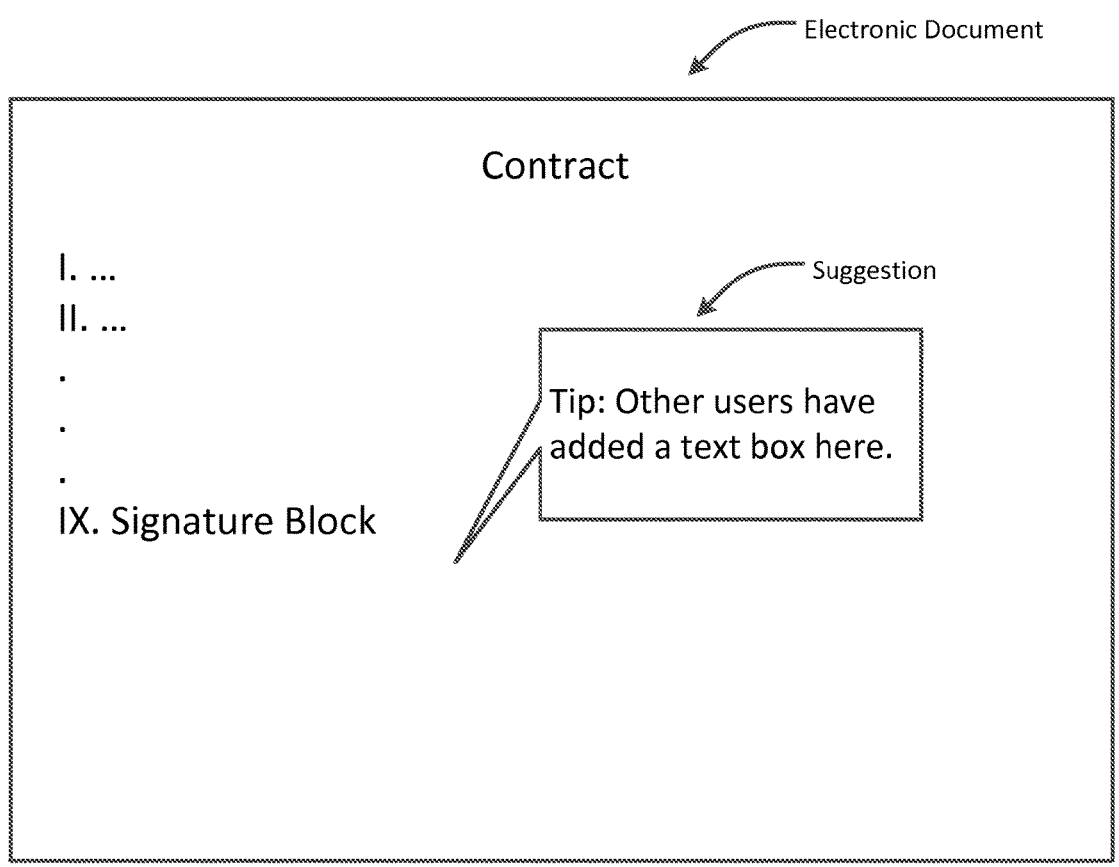

FIG. 4B is an example user interface for providing an electronic document and an enhanced user interaction feature to one or more users, in accordance with an embodiment. As discussed with respect to FIG. 4A, an enhanced user interaction feature can be provided with an electronic document to a new user of the document. The enhanced user interaction feature can be associated with one or more operations performed by a prior user. For example, as shown in FIG. 4B, a contract may include a section for a signature, but the document may not necessarily include a text box for indicating where the signature should be placed. Thus, a prior user may have performed an operation to add one or more text boxes to the signature section of the document. Such an operation can be recorded as a usage of the document, which in turn can form the basis of the enhanced user interaction feature. In this example, the enhanced user interaction feature may be configured to automatically display a suggestion to the user "other users have added a text box here," as depicted in FIG. 4B, when the new user opens the document, or at some other time, such as while the user hovers a mouse pointer over the signature section of the document for some period of time (e.g., five seconds).

Figure 5A:
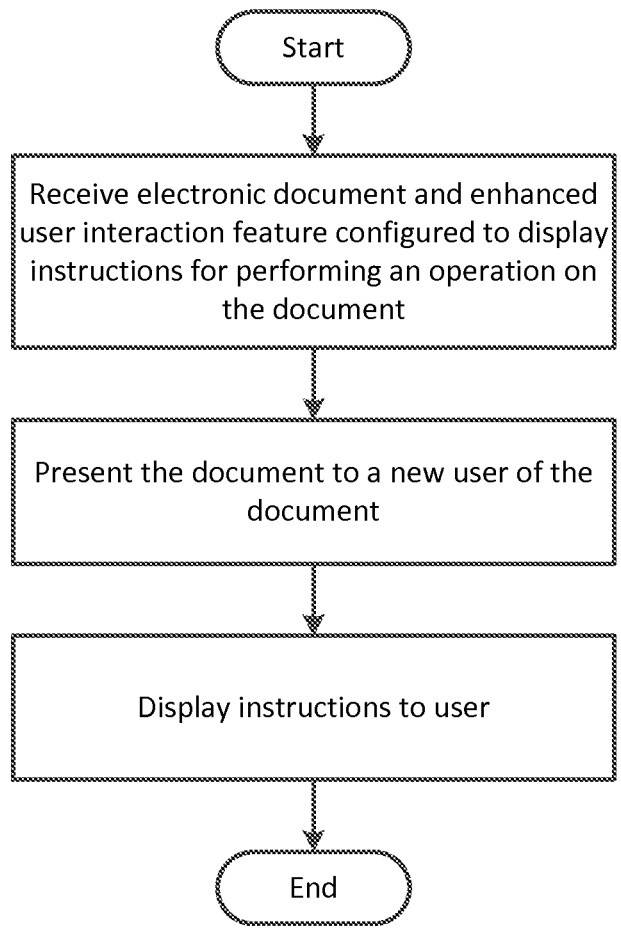

FIG. 5A is a flow diagram of another example methodology for providing an electronic document and an enhanced user interaction feature to one or more users, in accordance with an embodiment. An electronic document is received along with an enhanced user interaction feature configured to display instructions for performing an operation on the document. The document is then presented to a new user of the document (e.g., a user who is unfamiliar with the document or who has not previously interacted with the document). Subsequently, the instructions are displayed to the user. The instructions may, for example, take the form of text or graphics that supplement or annotate the content of the document or the user interface. In another example, the instructions may take the form of an interactive element (e.g., an on-screen control that is responsive to a user input) that enables the user to easily perform a particular operation on the document.

Figure 5B:
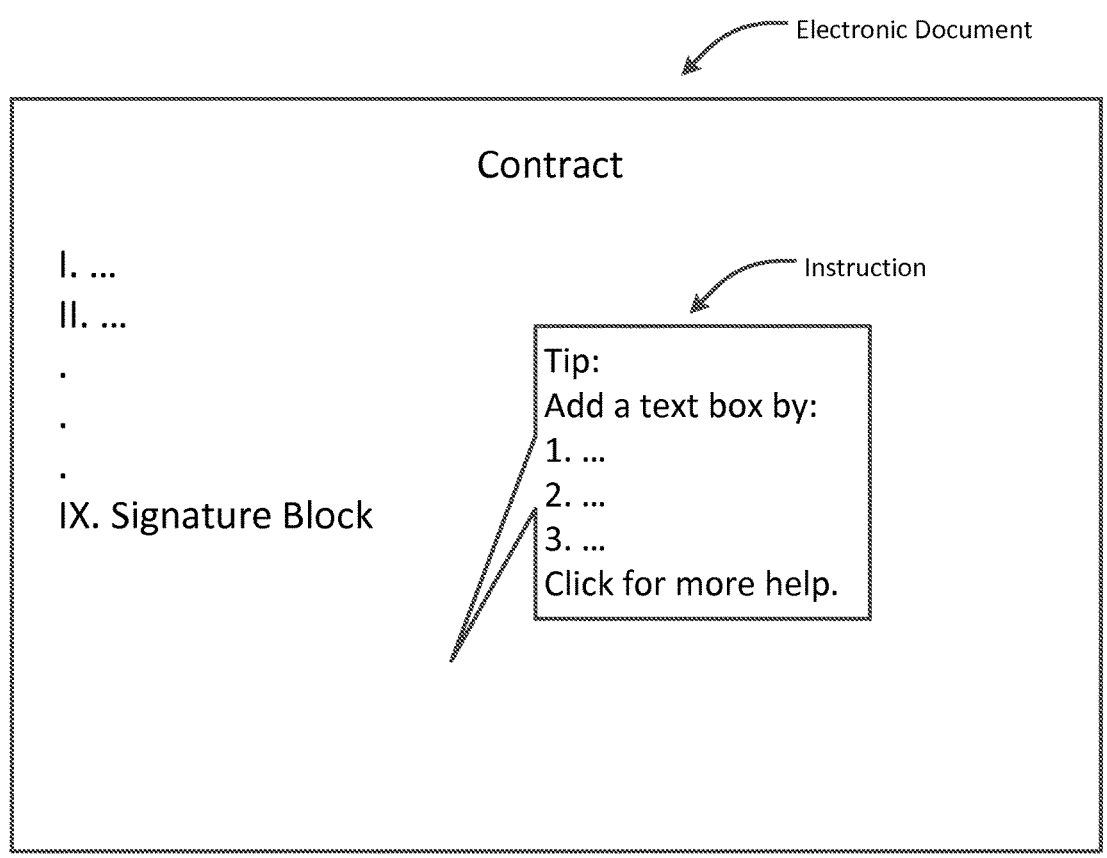

FIG. 5B is an example user interface for providing an electronic document and an enhanced user interaction feature to one or more users, in accordance with an embodiment. As discussed with respect to FIG. 5A, an enhanced user interaction feature can be provided with an electronic document to a new user of the document. The enhanced user interaction feature can be associated with one or more operations performed by a prior user. For example, as shown in FIG. 5B, a contract may include a section for a signature, but the document may not necessarily include a text box for indicating where the signature should be placed. Thus, a prior user may have performed an operation to add one or more text boxes to the signature section of the document. Such an operation can be recorded as a usage of the document, which in turn can form the basis of the enhanced user interaction feature. In this example, the enhanced user interaction feature may be configured to automatically display instructions to the user for adding a text box when the new user opens the document, or at some other time, such as while the user hovers a mouse pointer over the signature section of the document for some period of time (e.g., five seconds).

Figure 6A:
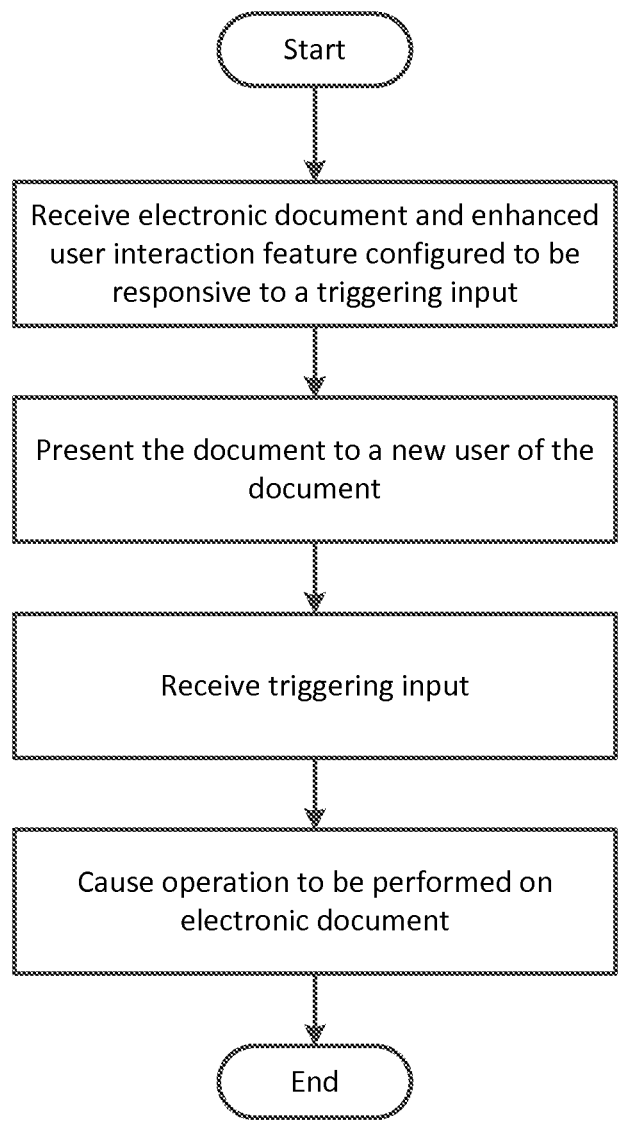

FIG. 6 is a flow diagram of another example methodology for providing an electronic document and an enhanced user interaction feature to one or more users, in accordance with an embodiment. An electronic document is received along with an enhanced user interaction feature configured to be responsive to a triggering input, such as a mouse click, key press or touch screen input. The document is then presented to a new user of the document (e.g., a user who is unfamiliar with the document or who has not previously interacted with the document), or a prior user of the document. Subsequently, the triggering input is received, which causes an operation to be performed on the document.

Figure 6B:
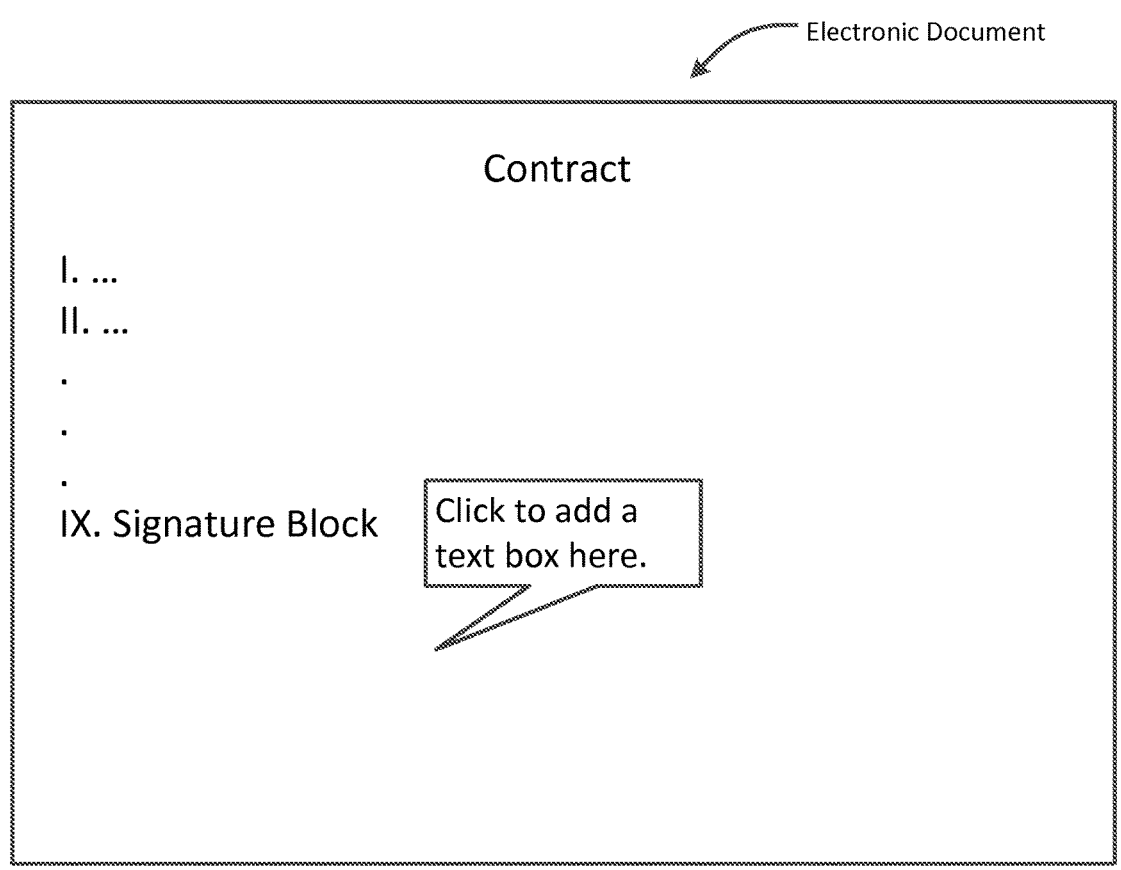

FIG. 6B is an example user interface for providing an electronic document and an enhanced user interaction feature to one or more users, in accordance with an embodiment. As discussed with respect to FIG. 6A, an enhanced user interaction feature can be provided with an electronic document to a new user of the document. The enhanced user interaction feature can be associated with one or more operations performed by a prior user. For example, as shown in FIG. 6B, a contract may include a section for a signature, but the document may not necessarily include a text box for indicating where the signature should be placed. Thus, a prior user may have performed an operation to add one or more text boxes to the signature section of the document. Such an operation can be recorded as a usage of the document, which in turn can form the basis of the enhanced user interaction feature. In this example, the enhanced user interaction feature may be configured to automatically add a text box when the new user clicks on a portion of the user interface (e.g., a "click to add text block here" balloon).

In a specific embodiment, the enhanced user interaction feature can be configured to help a user interact with a document by making available specific information submitted by prior document users, presenting variants of the document that are arranged for a particular class of users, or both, in response to a triggering input (e.g., clicking on an input field of a form, entering a page number, attaching a file, etc.). The information may, for example, include hints, suggestions, summaries, annotations, notes, usage recommendations, file names and locations, or any other kind of information that is associated with the document. In some cases, the information can be created by the author, while in other cases the information can be added to the document by other users. Electronic documents can, in a sense, be considered a symbolic representation of author's thoughts and views arranged in a particular format and layout. In other words, a document is created when the author wants to give a shape and a structure to his or her thoughts, views and information so that they can be consumed and understood by others. However, it will be appreciated that a given document may be used by different people having varied backgrounds, interests and objectives, making it more difficult to author the document so that it can be consumed and understood by others. For instance, it is possible that a document that is over-detailed or lengthy for one group of people may at the same time be self-explanatory and easy to understand by others. Further, there is no seamless way to transfer guidance from document authors or commentators to other users of the document. Thus, by configuring an enhanced user interaction feature for the document based on prior usage of the document by other users, the feature can guide or assist a subsequent user to interact with the document in the same or a similar manner as the prior users.

For instance, the enhanced user interaction feature can be configured to enable a user to associate a casting or context or role with the documents they author or read. In some embodiments, a casting of a document by a person can generally refer to something which can contain that person's expressions, thoughts and interactions with a given document. This casting can be created, for example, as a video from a person expressing herself about the document. In another example, the casting can be associated with a version of the document that reflects a person's interactions with the content in the document, or is based on information queried from, inferred, or otherwise known about the various users. For example, a large contract document may be read by multiple personnel at a company, each having a different role (e.g., engineering, accounting, purchasing, manufacturing, legal, etc.). In one example such case, readers of the document in the role of engineering might have particular interest in the sections defining the technical specifications and parameters of the product to be delivered, while readers of the document having a legal role will have particular interest in the sections assigning liability or granting rights, while readers of the document in the role of accounting will have particular interest in the sections assigning costs and payments, while readers of the document in the role of manufacturing will have particular interest in the sections defining production volumes and delivery dates, etc. Each such casting or role-based usage information can be adapted for and used by a particular group of users that are similarly situated and provide guidance to those users with respect to consuming the content of the document. It can also help users in understanding the gist of the document if those users do not want to read through the entire document by highlighting or otherwise organizing the content in a certain way.

In some other embodiments, a casting of a document can generally refer to an amount of time a user wishes to spend interacting with a document. For example, there may be 5-minute, 15-minute or 30-minute castings of the same document, any or all of which may be provided as options to another user of the document. An enhanced user interaction feature of a short (e.g., 5-minute) time-duration casting may, for example, be configured to direct the reader to highlights of the document's contents (e.g., an executive summary) and skip over most details. By contrast, an enhanced user interaction feature of a long (e.g., 30-minute) time-duration casting may, for example, be configured to direct the reader to more detailed sections of the document, so that the reader can explore the document more deeply.

Figure 7:
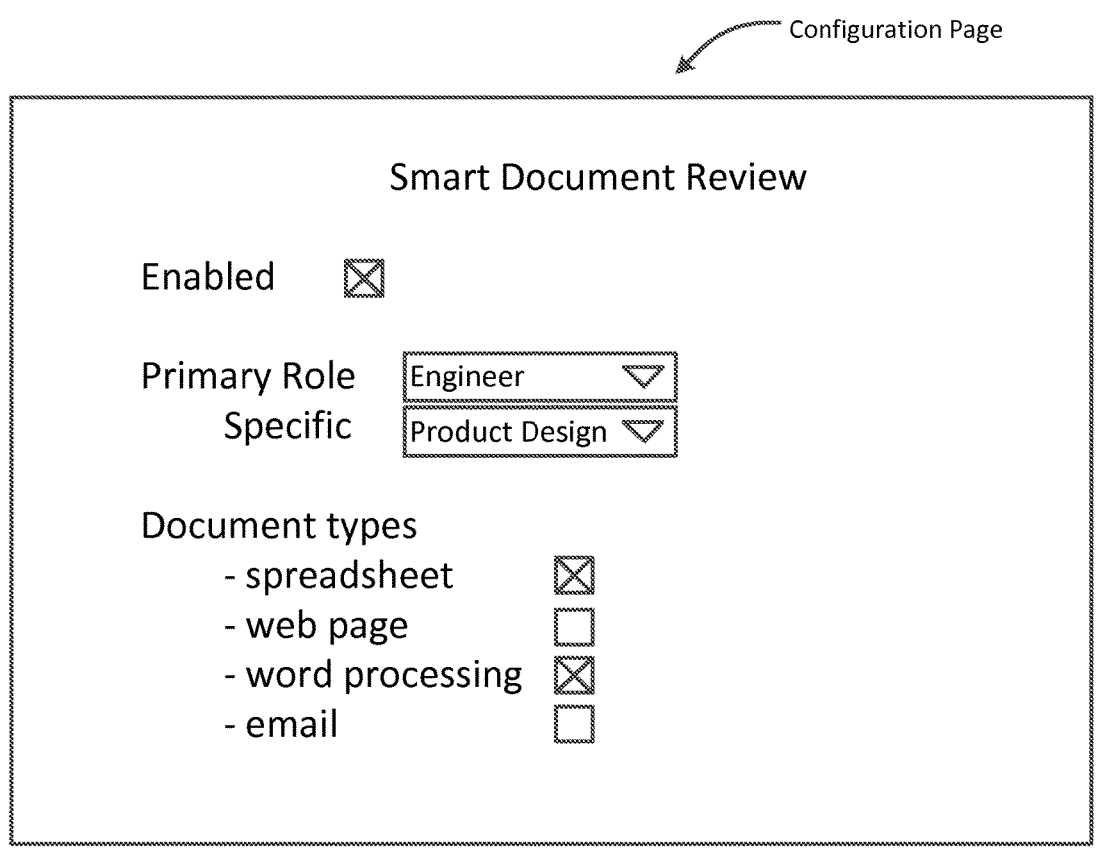

FIG. 7 shows an example user interface of a given application (e.g., Adobe Reader or any other interactive environment), configured in accordance with an embodiment of the present invention. As can be seen, the interface allows a reviewer to activate a smart document review feature as provided herein. The smart document review, which may be a type of enhanced user interaction feature such as described herein, can be used to enable users other than the author of the document to interact with the document in a manner that is customized or otherwise adapted for the user's reviewing role. The example user interface can provide, for instance, a toggle switch for enabling or disabling certain features of the smart document review. The example user interface is further configured to provide controls for selecting the role and specific function of the user or users who will be reviewing a document. For example, the smart document review may cause certain portions of the document that are most relevant to the role and specific function of the reviewer to be automatically displayed when the reviewer opens the document, based on the characteristics of the reviewer (e.g., role, title, project team, organization, company, etc.). The example user interface is further configured to provide controls for selecting the types of documents that the role and specific function should be applied to, such as a spreadsheet, web page, word processing or email document.

In another embodiment, a given user's role can be automatically inferred by comparing the user's actions with the prior actions of the same user or other users, thereby bypassing or otherwise reducing the need for a user interface as shown in FIG. 7, or at least the need to define a user's role. To this end, the enhanced user interaction feature can be configured to infer or otherwise generate roles and contexts by automatically grouping multiple prior user interactions (e.g., based on similarity of actions from one user to the next in that group), and using those groupings to automatically identify roles or contexts associated with subsequent users that use similar actions when interacting with that same document (or other documents like that same document). In this way, the original document does not have to have pre-determined contexts.

In another embodiment, the enhanced user interaction feature can be configured to help a user interact with a document by analyzing file attachment patterns in this user's past behavior or the behavior of other users, suggesting proper attachments to be made to a form or document, and validating attachments and their contents against a set of rules, some of which may be established by the author of the document or by analysis of operations performed on the document by other users. Forms are documents that can be used to collecting data from various users. Some forms can contain various types of fields, including fields having provisions for attaching other data files to the form. For example, an author of a form may require the form-filler to attach passport information and provide additional supplementary documents. Sometimes, the author sends a scanned form via email or some other distribution method. However, the form-filler upon receiving the form may not know which documents should be attached to the form. Thus, there is a possibility that an incorrect document is attached. There are no existing techniques for validating the attachment to ensure that only correct documents are attached. Further, there is no existing technique for suggesting which of the documents available to the user (e.g., locally on a user computing device or in a network-based file storage system) can be attached to a particular form. Thus, by configuring an enhanced user interaction feature for the form based on prior usage of the form by other users, the feature can guide or assist the user to interact with the form in the same or a similar manner as the prior users. In another embodiment, a set of rules can be generated from the usage data collected from previous user interactions with a form and used to guide other users who interact with the form. Based on the rules, for instance, file attachments can be validated against the values that users fill in various form fields. Furthermore, based on the rules, other users of the form can be given suggestions of files present in their network or local repository that may be attached to the form.

Example Computing Device

Figure 8:
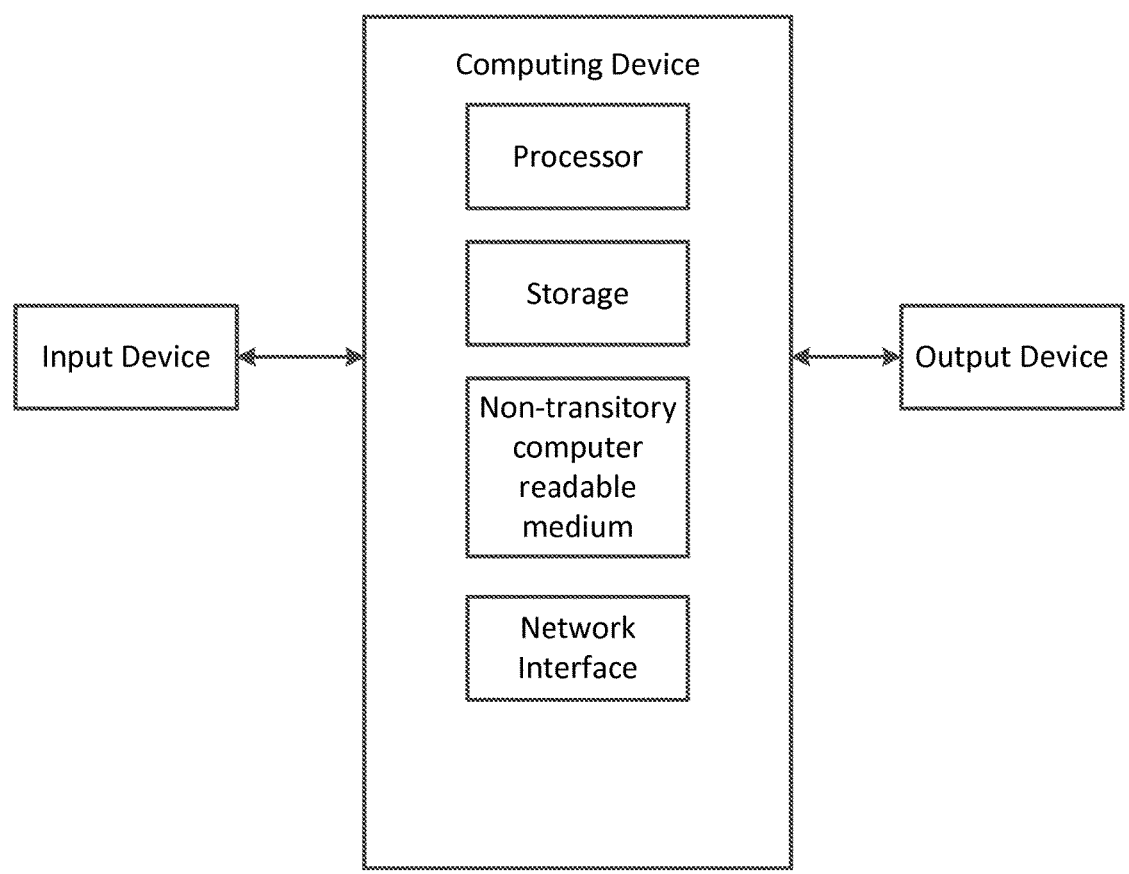
FIG. 8 is a block diagram representing an example computing device that may be used in accordance with an embodiment of the present invention.

FIG. 8 is a block diagram representing an example computing device that may be used to perform any of the techniques as variously described herein. For example, the computing devices, the server, or any combination of these (such as described with respect to FIG. 1) may be implemented in the computing device. The computing device may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device includes one or more storage devices and/or non-transitory computer-readable media having encoded thereon one or more computer-executable instructions or software for implementing techniques as variously described herein. The storage devices may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught herein. The storage device may include other types of memory as well, or combinations thereof. The storage device may be provided on the computing device or provided separately or remotely from the computing device. The non-transitory computer-readable media may include, but are not limited to, one or more types of hardware memory, non-transitory tangible media (for example, one or more magnetic storage disks, one or more optical disks, one or more USB flash drives), and the like. The non-transitory computer-readable media included in the computing device may store computer-readable and computer-executable instructions or software for implementing various embodiments. The computer-readable media may be provided on the computing device or provided separately or remotely from the computing device.

The computing device also includes at least one processor for executing computer-readable and computer-executable instructions or software stored in the storage device and/or non-transitory computer-readable media and other programs for controlling system hardware. Virtualization may be employed in the computing device so that infrastructure and resources in the computing device may be shared dynamically. For example, a virtual machine may be provided to handle a process running on multiple processors so that the process appears to be using only one computing resource rather than multiple computing resources. Multiple virtual machines may also be used with one processor.

A user may interact with the computing device through an output device, such as a screen or monitor, which may display one or more user interfaces provided in accordance with some embodiments. The output device may also display other aspects, elements and/or information or data associated with some embodiments. The computing device may include other I/O devices for receiving input from a user, for example, a keyboard, a joystick, a game controller, a pointing device (e.g., a mouse, a user's finger interfacing directly with a display device, etc.), or any suitable user interface. The computing device may include other suitable conventional I/O peripherals. The computing device can include and/or be operatively coupled to various suitable devices for performing one or more of the functions as variously described herein. The computing device may include a network interface for communicating with other devices via a network, such as the Internet.

The computing device may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

As will be appreciated in light of this disclosure, the various modules and components of the system shown in FIG. 1, such as the document presentation module, the enhanced user interaction configuration module, the document interaction module, and the usage module, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. It will be appreciated that, in some embodiments, various functions performed by the user computing system, as described herein, can be performed by similar processors and/or databases in different configurations and arrangements, and that the depicted embodiments are not intended to be limiting. Various components of this example embodiment, including the user computing system, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a system including a storage having at least one memory, and one or more processors each operatively coupled to the storage. The one or more processors are configured to carry out a process including presenting an electronic document to a first user in a first interactive environment; receiving usage data representing an operation performed on the electronic document by the first user; configuring, based on the usage data, an enhanced user interaction feature associated with the operation; and presenting the electronic document and the enhanced user interaction feature to a second user in a second interactive environment. The enhanced user interaction feature is operative to improve interaction between the second user and the electronic document by automatically performing the operation or assisting the second user with performance of the operation. In some cases, the enhanced user interaction feature is configured to automatically perform the associated operation while the second user is interacting with the electronic document in the second interactive environment. In some cases, the enhanced user interaction feature is configured to display, in the second interactive environment, a suggestion to the second user for performing the associated operation. In some cases, the enhanced user interaction feature is configured to display, in the second interactive environment, instructions to the second user for performing the associated operation. In some cases, the enhanced user interaction feature includes an interactive element that is responsive to a triggering input of the second user in the second interactive environment. In some such cases, the interactive element is configured to cause the associated operation to be performed in response to the triggering input.

In some other such cases, the interactive element is configured to highlight a portion of the second interactive environment corresponding to the associated operation. In some cases, the usage data represents a plurality of operations performed on the electronic document by the first user. In some such cases, the process includes determining which one of the operations occurred most frequently, where the enhanced user interaction feature is associated with the most frequently occurring operation. In some other such cases, the process includes determining a sequence in which the operations were performed, where the enhanced user interaction feature is associated with the sequence of operations. In some cases, the electronic document includes a first context and a second context, and the process includes, in response to a determination that the second user has a characteristic in common with the first user, configuring the enhanced interaction feature to apply the first context to the second interactive environment; otherwise, configuring the enhanced interaction feature to apply the second context to the second interactive environment. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
    presenting an electronic document to a first user in a first interactive environment;
    receiving usage data representing a plurality of operations performed on the electronic document by the first user;
    configuring, based on the usage data, an enhanced user interaction feature associated with at least one of the operations; and
    presenting the electronic document and the enhanced user interaction feature to a second user in a second interactive environment,
    wherein the enhanced user interaction feature is operative to improve interaction between the second user and the electronic document by
        generating roles by grouping prior user actions with the electronic document based on similarity of actions from a first prior user to a second prior user,
        identifying a role associated with the second user in the second interactive environment based on similarity of one or more actions of the second user in the second interactive environment to the groupings of prior user actions, and
        automatically performing a new operation according to the role associated with the second user or assisting the second user with performance of the new operation according to the role associated with the second user.

2. The method of claim 1, wherein the enhanced user interaction feature is configured to display, in the second interactive environment, a suggestion to the second user for performing the new operation while the second user is interacting with the electronic document in the second interactive environment.

3. The method of claim 1, wherein the enhanced user interaction feature is configured to display, in the second interactive environment, instructions to the second user for performing the new operation.

4. The method of claim 1, wherein the enhanced user interaction feature includes an interactive element that is responsive to a triggering input of the second user in the second interactive environment.

5. The method of claim 4, wherein the interactive element is configured to cause the new operation to be performed in response to the triggering input.

6. The method of claim 1, further comprising determining which one of the plurality of operations occurred most frequently, wherein the enhanced user interaction feature is associated with the most frequently occurring operation.

7. The method of claim 1, further comprising determining a sequence in which the plurality of operations were performed, wherein the enhanced user interaction feature is associated with the sequence of operations.

8. The method of claim 1, wherein at least one of the plurality of operations includes an operation performed on at least one of a plurality of hyperlinks in the electronic document.

9. The method of claim 1, wherein the new operation is an extension to functionality provided by the electronic document.

10. The method of claim 1, wherein the new operation includes suggesting an attachment to be made to the electronic document.

11. The method of claim 1, wherein the new operation is one of the plurality of operations performed on the electronic document by the first user.

12. The method of claim 1, wherein the new operation includes an operation on at least one of a plurality of hyperlinks in the electronic document.

13. A system comprising:
    a storage; and
    a processor operatively coupled to the storage and configured to execute instruction stored in the storage that when executed cause the processor to carry out a process comprising:
        presenting an electronic document to a first user in a first interactive environment;
        receiving usage data representing a plurality of operations performed on the electronic document by the first user;
        configuring, based on the usage data, an enhanced user interaction feature associated with at least one of the operations; and
        presenting the electronic document and the enhanced user interaction feature to a second user in a second interactive environment,
        wherein the enhanced user interaction feature is operative to improve interaction between the second user and the electronic document by
            generating roles by grouping prior user actions with the electronic document based on similarity of actions from a first prior user to a second prior user,
            identifying a role associated with the second user in the second interactive environment based on similarity of one or more actions of the second user in the second interactive environment to the groupings of prior user actions, and automatically performing a new operation according to the role associated with the second user or assisting the second user with performance of the new operation according to the role associated with the second user.

14. The system of claim 13, wherein the enhanced user interaction feature is configured to automatically perform the new operation while the second user is interacting with the electronic document in the second interactive environment.

15. The system of claim 13, wherein the enhanced user interaction feature is configured to display, in the second interactive environment, instructions to the second user for performing the new operation.

16. The system of claim 13, wherein the enhanced user interaction feature includes an interactive element that is responsive to a triggering input of the second user in the second interactive environment.

17. The system of claim 16, wherein the interactive element is configured to cause the new operation to be performed in response to the triggering input.

18. The system of claim 16, wherein the interactive element is configured to highlight a portion of the second interactive environment corresponding to the new operation.

19. The system of claim 13, wherein the new operation is an extension to functionality provided by the electronic document.

20. A non-transitory computer program product having instructions encoded thereon that when executed by one or more processors cause a process to be carried out, the process comprising:

presenting an electronic document to a first user in a first interactive environment;

receiving usage data representing a plurality of operations performed on the electronic document by the first user;

configuring, based on the usage data, an enhanced user interaction feature associated with at least one of the operations; and presenting the electronic document and the enhanced user interaction feature to a second user in a second interactive environment, wherein the enhanced user interaction feature is operative to improve interaction between the second user and the electronic document by generating roles by grouping prior user actions with the electronic document based on similarity of actions from a first prior user to a second prior user, identifying a role associated with the second user in the second interactive environment based on similarity of one or more actions of the second user in the second interactive environment to the groupings of prior user actions, and automatically performing a new operation according to the role associated with the second user or assisting the second user with performance of the new operation according to the role associated with the second user.

* * * * *